O. S. BLISS.
Weighing Apparatus.
No. 51,416.
Patented Dec. 12, 1865.
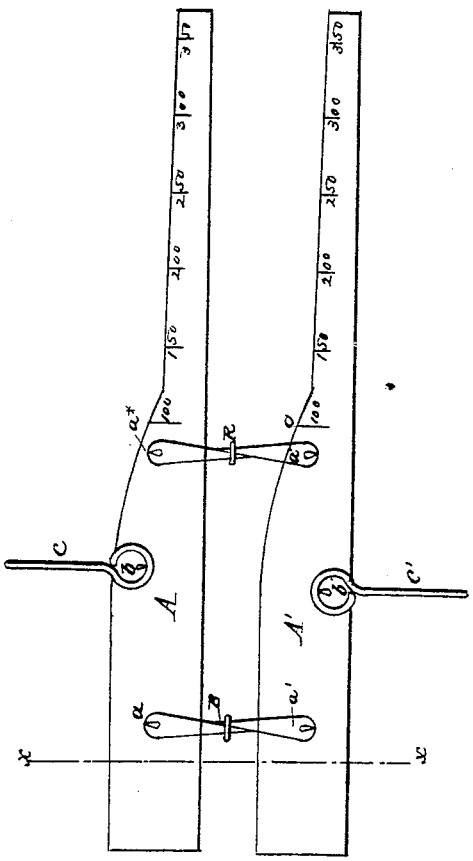
WITNESSES:
INVENTOR
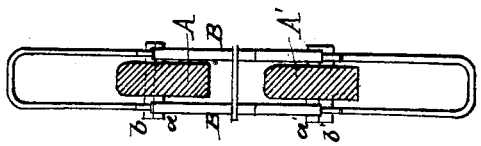

UNITED STATES PATENT OFFICE.

ORVILLE S. BLISS, OF FAIRFIELD, VERMONT.

IMPROVEMENT IN WEIGHING APPARATUS.

Specification forming part of Letters Patent No. 51,416, dated December 12, 1865.

*To all whom it may concern:*

Be it known that I, ORVILLE S. BLISS, of Fairfield, Franklin county, and State of Vermont, have made certain new and useful Improvements in Weighing Apparatus; and I do hereby declare that the following description and accompanying drawings are sufficient to enable any person skilled in the art to which it most nearly appertains to make and use my said invention or improvements without further invention or experiment.

The nature of my invention and improvements in weighing with two beams having a single suspension and a double connection between the beams consists in extending one or both beams beyond the pivots at one end and graduating such extension or extensions for a movable poise or poises.

In the accompanying drawings, Figure 1 is a section, as seen to the right of the line $x\ x$ of Fig. 2. Fig. 2 is an elevation of the two beams.

The upper beam, A, is provided with knife-edged pivots $b$ for the clevis $c$, by which the beam is suspended. This beam A is also provided with two other knife-edged pivots, $a\ a^*$, for the double clevises B B, which connect it to the knife-edged pivots $a'\ a'^*$ in the beam A', which hangs right under the beam A, and is provided with knife-edged pivots $b'$ for the clevis $c'$, by which the substance or thing to be weighed is suspended.

One or both of the beams A and A' may be extended to the right hand from the pivots $a^*$ $a'^*$, as shown in the drawings, and graduated for the poise or poises which are to determine the weight of the article weighed.

I arrange the knife-edged pivots in the beam A as follows: The distance from $a$ to $b$ is five inches, and from $b$ to $a^*$ is four inches. On the lower beam the distance from $a'$ to $b'$ is four and a half inches, and from $b'$ to $a'^*$ is four and a half inches. The distance from $a^*$ to the first mark of the graduated scale on the beam A is one inch, and the graduation marks or divisions two and one-half inches apart, and with a ten-pound poise at the first division one hundred pounds is indicated; at the second, one hundred and fifty; at the third, two hundred, and so on. The first graduation on the beam A' is one inch from the pivot $a'^*$, and the second two and a half inches from the first, and the third two and a half inches from the second, and so on. The beams should be balanced with a one-pound poise at the first division on A', marked 0, then move it to the second division, which is five pounds, and the third ten pounds. On each of the beams the divisions of the graduations named may be subdivided in such manner as may suit the purposes for which the apparatus is intended.

Although I have stated the relative positions of the several pivots in each beam and the divisions of the graduations on the beams, I contemplate the relative positions of the pivots may be changed in either or both beams, and the graduations and poises also, and still retain the merit or principle of the improvements which I have invented. Thus the pivot $b$ in the upper beam may be put midway between the other two, and the pivot $b'$ in the lower beam four inches from $a'$, for the same graduations and poises.

What I claim as my invention and improvement in weighing apparatus with two beams having a single suspension and double connection, as described, is—

Extending one or both beams beyond the pivots at one end, and graduating such extension for a movable poise or poises.

ORVILLE S. BLISS.

Witnesses:
J. O. CRAMTON,
H. E. BENTLEY.